United States Patent
Ohtomo

(10) Patent No.: US 8,705,079 B2
(45) Date of Patent: Apr. 22, 2014

(54) INFORMATION PROCESSING APPARATUS

(75) Inventor: Toshinori Ohtomo, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1084 days.

(21) Appl. No.: 11/829,710

(22) Filed: Jul. 27, 2007

(65) Prior Publication Data

US 2008/0024820 A1 Jan. 31, 2008

(30) Foreign Application Priority Data

Jul. 27, 2006 (JP) ................................. 2006-204049

(51) Int. Cl.
*G06F 15/00* (2006.01)

(52) U.S. Cl.
USPC .......... 358/1.15; 358/1.2; 358/1.13; 715/809; 715/700; 700/108

(58) Field of Classification Search
USPC ............. 358/1.15, 1.13, 1.1; 715/809; 399/16
See application file for complete search history.

(56) References Cited

U.S. PATENT DOCUMENTS

| | | | | |
|---|---|---|---|---|
| 5,923,013 | A * | 7/1999 | Suzuki et al. ............... | 235/375 |
| 6,801,822 | B1 * | 10/2004 | Fujiwara et al. ............ | 700/108 |
| 6,823,147 | B2 * | 11/2004 | Jackelen et al. ............ | 399/16 |
| 6,834,929 | B1 * | 12/2004 | Adams et al. ............... | 347/19 |
| 6,847,466 | B1 * | 1/2005 | Gazdik et al. ............... | 358/1.15 |
| 6,880,131 | B1 * | 4/2005 | Nakazono et al. ........... | 715/840 |
| 6,924,826 | B1 * | 8/2005 | Nakagiri et al. ............. | 715/700 |
| 6,941,523 | B1 * | 9/2005 | Mathieson .................. | 715/809 |
| 7,057,747 | B1 * | 6/2006 | Minagawa .................. | 358/1.13 |
| 7,161,693 | B2 * | 1/2007 | Kizaki et al. ................ | 358/1.13 |
| 7,248,383 | B2 * | 7/2007 | Yoshida et al. ............. | 358/1.15 |
| 7,301,656 | B1 * | 11/2007 | Nakagiri et al. ............ | 358/1.15 |
| 7,372,590 | B2 * | 5/2008 | Kuroda ...................... | 358/1.15 |
| 7,383,554 | B2 * | 6/2008 | Ozaki et al. ................ | 719/327 |
| 7,500,203 | B2 * | 3/2009 | Mori ........................... | 715/859 |
| 7,633,659 | B2 * | 12/2009 | Uotani et al. ............... | 358/527 |
| 7,733,507 | B2 * | 6/2010 | Toumanova et al. ........ | 358/1.13 |
| 7,869,081 | B2 * | 1/2011 | Komine ...................... | 358/1.18 |
| 8,081,342 | B2 * | 12/2011 | Kawamura .................. | 358/1.2 |
| 2004/0122655 | A1 * | 6/2004 | Yamakawa .................. | 704/4 |
| 2005/0248800 | A1 * | 11/2005 | Choi ........................... | 358/1.13 |
| 2005/0262439 | A1 * | 11/2005 | Cameron .................... | 715/523 |
| 2005/0264848 | A1 * | 12/2005 | Suzuki ......................... | 358/1.18 |
| 2006/0221361 | A1 * | 10/2006 | Takagi ........................ | 358/1.1 |
| 2008/0024820 | A1 * | 1/2008 | Ohtomo ...................... | 358/1.15 |
| 2008/0278749 | A1 * | 11/2008 | Sato ............................ | 358/1.15 |

FOREIGN PATENT DOCUMENTS

JP 2004-098375 4/2004

* cited by examiner

*Primary Examiner* — Ashish K Thomas

(74) *Attorney, Agent, or Firm* — Rabin & Berdo, P.C.

(57) ABSTRACT

An information processing apparatus for converting image data to print data. The apparatus includes a reception unit for receiving printing data concerning a prescribed print setting in a prescribed unit. An input unit inputs the print setting applied to the received printing data. A conversion unit converts the print setting corresponding to the print setting input by the input unit, within the print setting designated in the prescribed unit of printing data received by the reception unit, into the print setting input by the input unit.

18 Claims, 8 Drawing Sheets

STRUCTURAL DIAGRAM OF THE PRINTING SYSTEM AND THE INFORMATION PROCESSING APPARATUS OF THE FIRST EMBODIMENT

STRUCTURAL DIAGRAM OF THE PRINTING SYSTEM AND THE
INFORMATION PROCESSING APPARATUS OF THE FIRST EMBODIMENT

STRUCTURAL DIAGRAM OF THE INFORMATION
PROCESSING APPARATUS OF THE SECOND EMBODIMENT

DISPLAY BY THE AP

51 : PRINT QUALITY FORMAT SETTING LIST BOX

DISPLAY BY THE AP

51 : PRINT QUALITY FORMAT SETTING LIST BOX

51 : PRINT QUALITY FORMAT SETTING LIST BOX

INFORMATION PROCESSING APPARATUS

BACKGROUND OF THE INVENTION

1. Field of the Invention

The present invention relates to an information processing apparatus, such as a printer driver (hereinafter referred to as "driver") or an image forming apparatus for converting into printing data image data generated by application software (hereinafter referred to as "AP"), in, for example, a personal computer (hereinafter referred to as "PC") or the like.

2. Description of Related Art

Generally, in a printing system, text or the like created by the AP of the information processing apparatus is converted into image data through a GDI (Graphic Device Interface), converted by the driver into printing data made up of a print job unit, which is image command sequence data of a text image or a graphic image, and sent to a printing apparatus such as a printer to be printed.

For example, with an AP such as Microsoft's Excel software, text data or the like can be created in various forms such as a single page, multiple pages, a single worksheet, or multiple worksheets. Then, upon executing printing from the AP of the text data or the like created having the various forms, the driver manages the data as a print unit known as a print job.

Usually, because a single print job is generated by a single order to print and one type of print setting is applied in the print job, printing is executed with the same print setting for all of the pages and all of the worksheets. Therefore, if the desired print settings are set once, the desired printing result can be achieved (see, e.g., Japanese Patent Application Publication 2004-98375).

In a conventional information processing apparatus, however, to execute, at a time when different print settings are executed for each worksheet to set all of the worksheets to N-UP printing (a function by which the printing is shrunk to fit N pages on a single page), there is a case such that the print settings cannot be changed during printing, so that N-up printing cannot be achieved.

Furthermore, even in a case where the print settings are set to be common for all worksheets, a connection is switched from a printing apparatus connected at a time the worksheet was created to a printing apparatus adopting a different printing quality (resolution) designation format, and in a case where all worksheets are set as N-UP printing, the printing quality (resolution) designation format is changed, so that the print job is broken up and N-UP printing cannot be achieved.

SUMMARY OF THE INVENTION

The present invention adopts the following structure to solve the aforementioned problems. The information processing apparatus of the present invention contains a reception unit for receiving printing data concerning a prescribed print setting in a prescribed unit, an input unit for inputting the print setting applied to the received printing data, and a conversion unit for converting the print setting corresponding to the print setting input by the input unit, within the print setting designated in the prescribed unit of printing data received by the reception unit, into the print setting input by the input unit.

Even where the print settings are different for each worksheet, the common print settings can be taken over to subsequent worksheets, so that the desired printing can be achieved through the printing apparatus of the present invention.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

PREFERRED EMBODIMENTS

The following is a detailed description of embodiments according to the present invention, referencing diagrams. Elements common to multiple diagrams are given the same numeral.

First Embodiment

In the information processing apparatus according to a first embodiment, a print setting conversion section for taking over a common print setting to subsequent worksheets is included in the driver.

Figure 1:
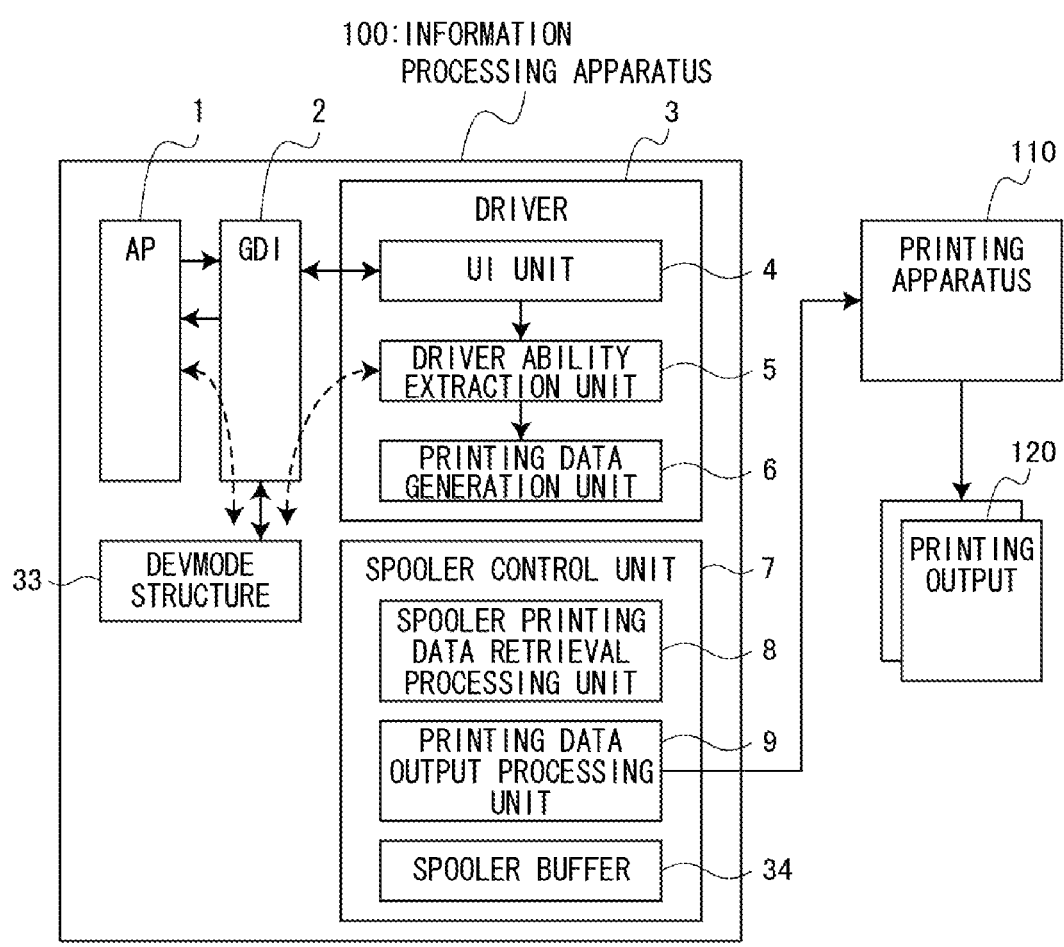
FIG. 1 is a structural diagram of a printing system and an information processing apparatus according to a first embodiment.

A structure of the information processing apparatus according to the first embodiment and a structure of the printing system are described using FIG. 1. The printing system according to the information processing apparatus of the first embodiment is structured such that an information processing apparatus 100, such as a PC, and a printing apparatus 110 are connected by an interface, such as a LAN, a USB, or a Centro interface, so that printing output 120 can be achieved as an output of the printing apparatus 110.

Concerning the structure of the information processing apparatus 100 in FIG. 1, the AP (1) is an application for creating text data to be printed, and is described using Microsoft's Excel as an example in the following description of an embodiment.

The GDI (2) is a device control unit included in an operating system (hereinafter referred to as "OS") and functions to interpret the text data and pass it on to the driver 3 at a time when the text data created by the AP (1) is converted into image data.

The driver 3 is made of a user interface unit (hereinafter referred to as "UI unit 4"), a driver ability extraction unit 5, and a printing data generation unit 6. The UI unit 4 has a function to open printer properties and execute settings relating to various types of printing. The driver ability extraction unit 5 has a function to set a driver ability having a query from the AP (1) through the GDI (2) to a prescribed location of a DEVMODE structure 33. The printing data generation unit 6 has a function to convert the image data from the AP (1) unto a printable format and store the printing data in a spool buffer 34.

The DEVMODE structure 33 refers to a memory structure used at a time when the application executes the print job, and is the structure in which the following information used in the print job is stored. For example, settings relating to printing such as printing orientation, paper size, paper length, paper width, enlarging/shrinking settings, number of copies, and paper supply unit structure can be stored. The AP (1) performs a printing process based on the information in the DEVMODE structure 33.

The DEVMODE structure 33 is made of a basic portion and an expanded portion. The basic portion has a predetermined structure and can be accessed from the application. Because the internal structure of the expanded portion is freely defined by each manufacturer to set a usable area, the expanded portion can usually be accessed from the driver 3. The DEVMODE structure 33 set by the AP (1) is received by the GDI (Graphic Device Interface) and the target printing is executed under control of the GDI and the print driver.

A spooler control unit 7 has a function to retrieve the printing data stored in the spooler buffer 34 and to control the output to the printing apparatus 110, and is made of a spooler printing data retrieval processing unit 8 and a printing data output processing unit 9.

Figure 2:
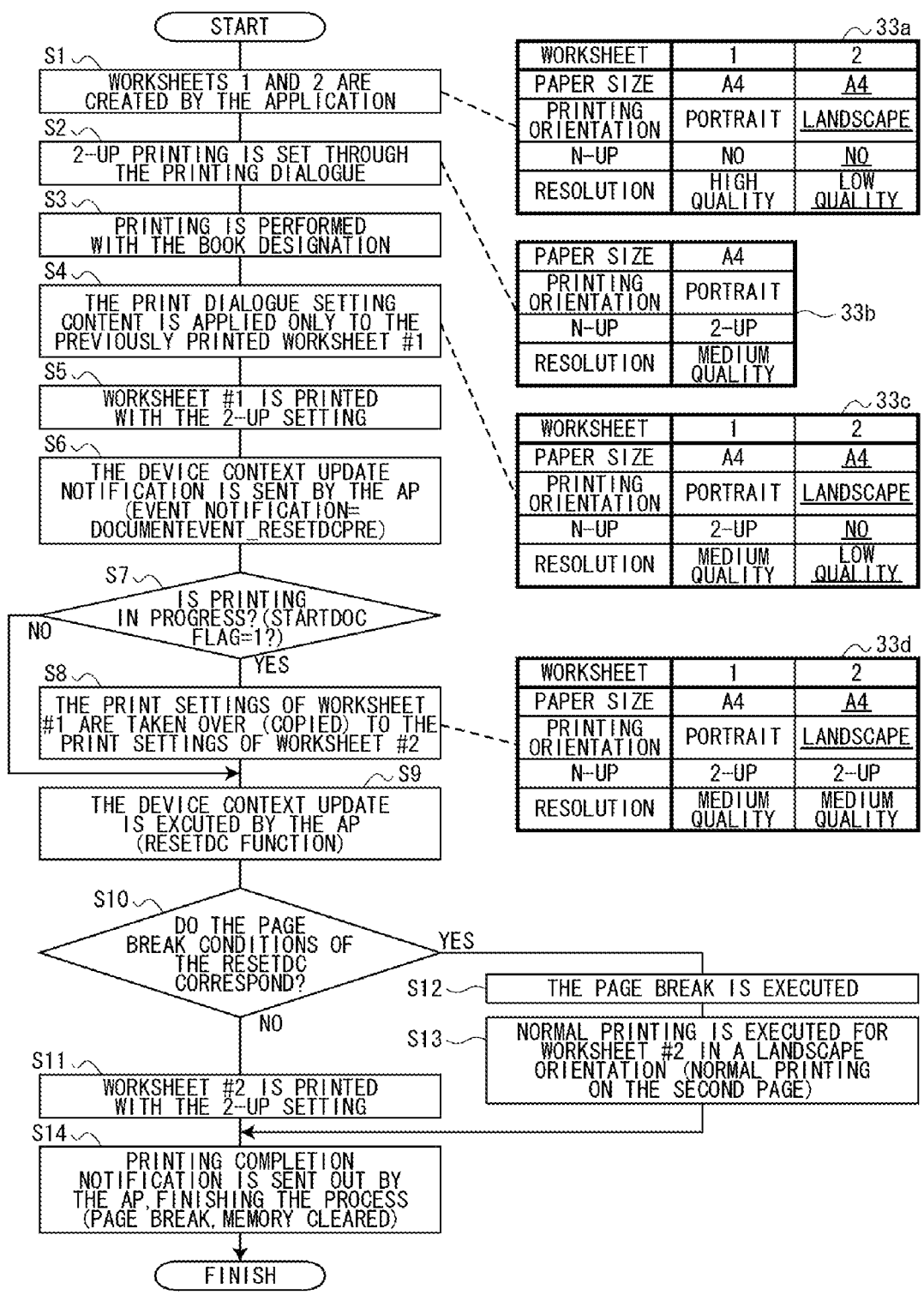
FIG. 2 is a performance flow chart of the information processing apparatus according to the first embodiment.

Through the aforementioned structure, an information processing apparatus according to a first embodiment performs as described below. The performance is described using the performance flow chart of FIG. 2. In the following description, an example performance is used of a case where worksheet #1 is set to have a paper size of A4, a portrait printing orientation, a negative setting for N-UP printing, and high quality resolution, and worksheet #2, as described by underlined portions, is set to have a paper size of A4, a landscape printing orientation, a negative setting for N-UP printing, and low quality resolution, that is, a case where the orientation of printing and resolution are different, the paper size and N-UP print setting are the same, and 2-up printing is set for book designation.

First, the desired text is created as worksheet #1 and worksheet #2 and the aforementioned settings are set through the AP (1) (step S1, setting content 33a). The setting content of worksheet #2 is displayed with an underline because it is different from that of worksheet #1.

Next, for example, the paper size of A4 and the portrait printing orientation are set as common print settings, N-UP printing is set to 2-up, resolution is set to "medium quality" (setting content 33b), and printing is initiated with book printing (step S2, S3). For convenience, the content set by the print dialogue is displayed in italics.

The print settings 33b (in italics) set by the print dialogue are then applied only to worksheet #1 (step S4), and the print settings for worksheet #2 do not change from the setting content 33a set at step S1 (setting content 33a, underlined). Printing is then begun using the setting content 33a, so that worksheet #1 is printed with the print dialogue content of 2-up printing and medium quality (step S5).

Upon completing printing of worksheet #1, an event notification (DOCUMENT_RESETDCPRE) requesting preparation of a device context update is issued (step S6). With this notification as a trigger, the driver 3 checks whether printing is in progress (step S7).

Here, the device context refers to a structure for passing a memory address as a parameter in which the printing data is stored from the AP (1) to the GDI (2), rather than passing the data directly, and for storing this parameter.

The check for whether printing is in progress is executed to make a judgment as to whether a single print job is being processed, that is, to make a judgment as to whether to update the device context with the printing switch of the worksheet. The process of step S6 and step S7 shows an example using WindowsNT®.

At step S7, in a case where a judgment is made that printing is in progress, a process is executed to take over the common print setting of worksheet #1 to the print settings of worksheet #2 (step S8, setting content 33d). That is, information concerning the N-UP setting and resolution of worksheet #1, which is the common print setting, is copied to a prescribed member of the DEVMODE structure of worksheet #2, resulting in the information concerning the N-UP setting and the resolution of worksheet #2 being inherited from worksheet #1.

The AP (1) updates the device context through the ResetDC function, thereby putting the print settings the next worksheet #2 into effect (step S9).

Generally, the AP (1) updates the device context using the ResetDC function to change a tray or the like at a time when the OS receives a WM_DEVMODE CHANGE message.

Next, at a time when the process moves from printing worksheet #1 to printing worksheet #2, a judgment is made as to whether page break conditions correspond (step S10). The judgment as to whether the page break conditions correspond is based on whether the print settings, such as paper size, N-UP type, resolution, or the like, change between worksheets.

Then, because the common print settings are taken over to worksheet #2 from worksheet #1 at step S8, the process moves to step S11 without the page break conditions being made to correspond by the ResetDC function and without performing the page break.

Worksheet #2 is printed with 2-up on a right side of a first page (step S11), and as a finishing process, the memory used temporarily and performance of the page break is opened, thereby finishing the process.

On the other hand, in a case where, for example, the paper size of worksheet #2 is set to B5 or the like (not shown), printing of worksheet #2 is performed normally on a second page in a landscape orientation (step S13) after execution of the page break (step S12) because of the corresponding page break conditions of the ResetDC function, even where the common print settings are taken over.

In such a case, the 2-up book print setting is disregarded, resulting in 2-up printing not being performed. That is, worksheet #1 is printed on the left side of the first page in 2-up format but the right side is blank, and worksheet #2 is printed normally in a landscape orientation on the second page. Next, notification concerning the completion of the printing is sent out by the AP and the DEVMODE structure 33 is reset (step S14), thereby completing the process.

The above description of the embodiment uses N-UP setting and resolution as the common print settings, but a color mode setting, a double sided print setting, or the like may be added. Furthermore, the above description uses a printer driver as an example of the information processing apparatus, but an image forming apparatus may also be used as the information processing apparatus.

As described above, through the information processing apparatus of the first embodiment, the common print settings can be taken over to subsequent worksheets and the desired printing result can be achieved, even where the print settings for each worksheet are different, because the driver contains a conversion section, or namely a section for taking over the common print settings.

Second Embodiment

The information processing apparatus according to a second embodiment contains an AP resolution negation setting unit, and has a setting to negate a designation of printing quality (resolution) from the AP, so that a print job is not divided even where the printing quality (resolution) designated by the AP and the printing quality (resolution) designated by the driver are different.

Figure 3:
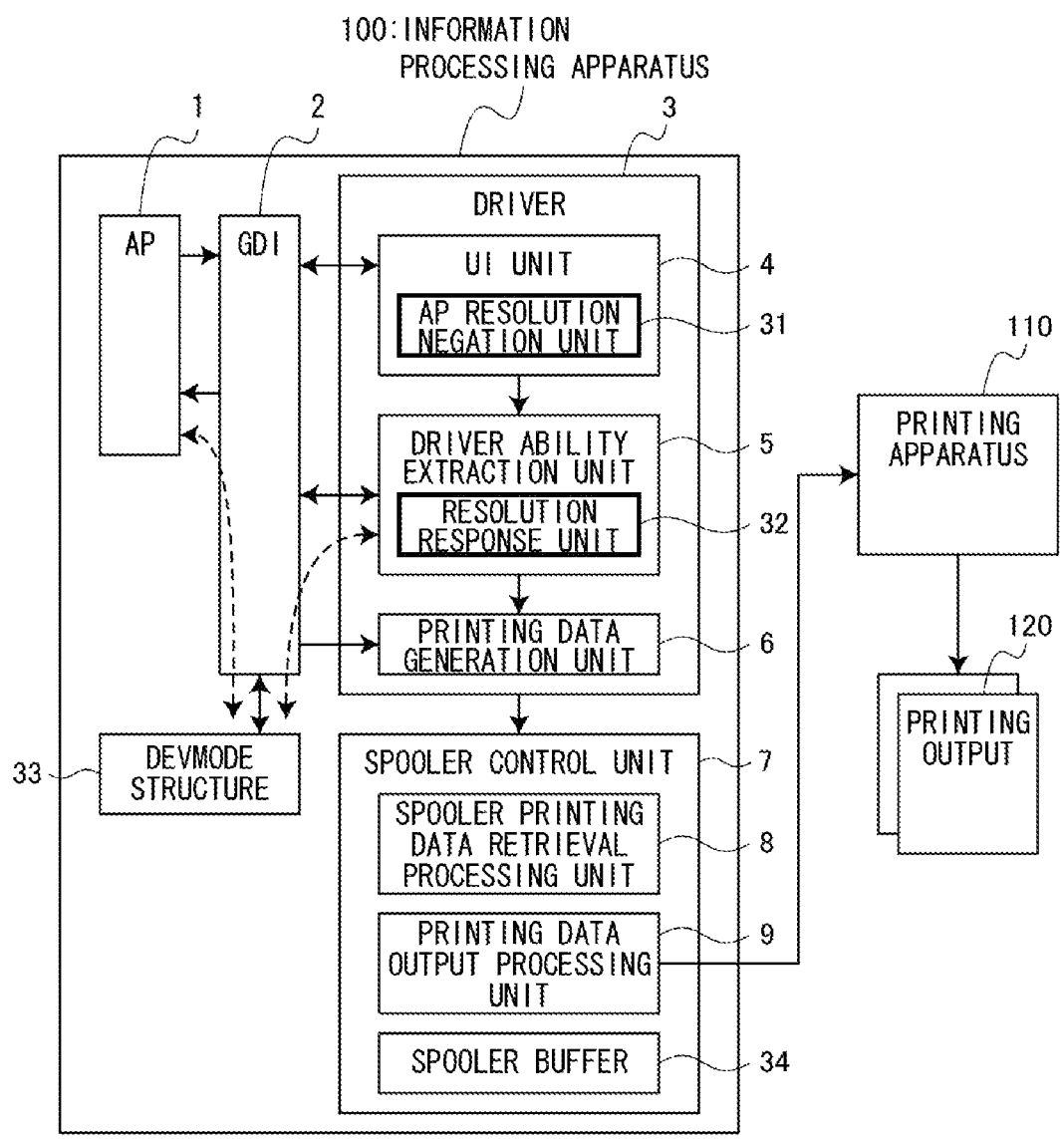
FIG. 3 is a structural diagram of a information processing apparatus according to a second embodiment.

A functional structure of the information processing apparatus of the second embodiment is shown in FIG. 3. As shown in FIG. 3, an AP resolution negation setting unit 31 is newly equipped on the UI unit 4 and a resolution response unit 32 is newly equipped on the driver ability extraction unit 5. The remaining structure is the same as that of the information processing apparatus of the first embodiment, and therefore a detailed description is omitted.

Figure 4:
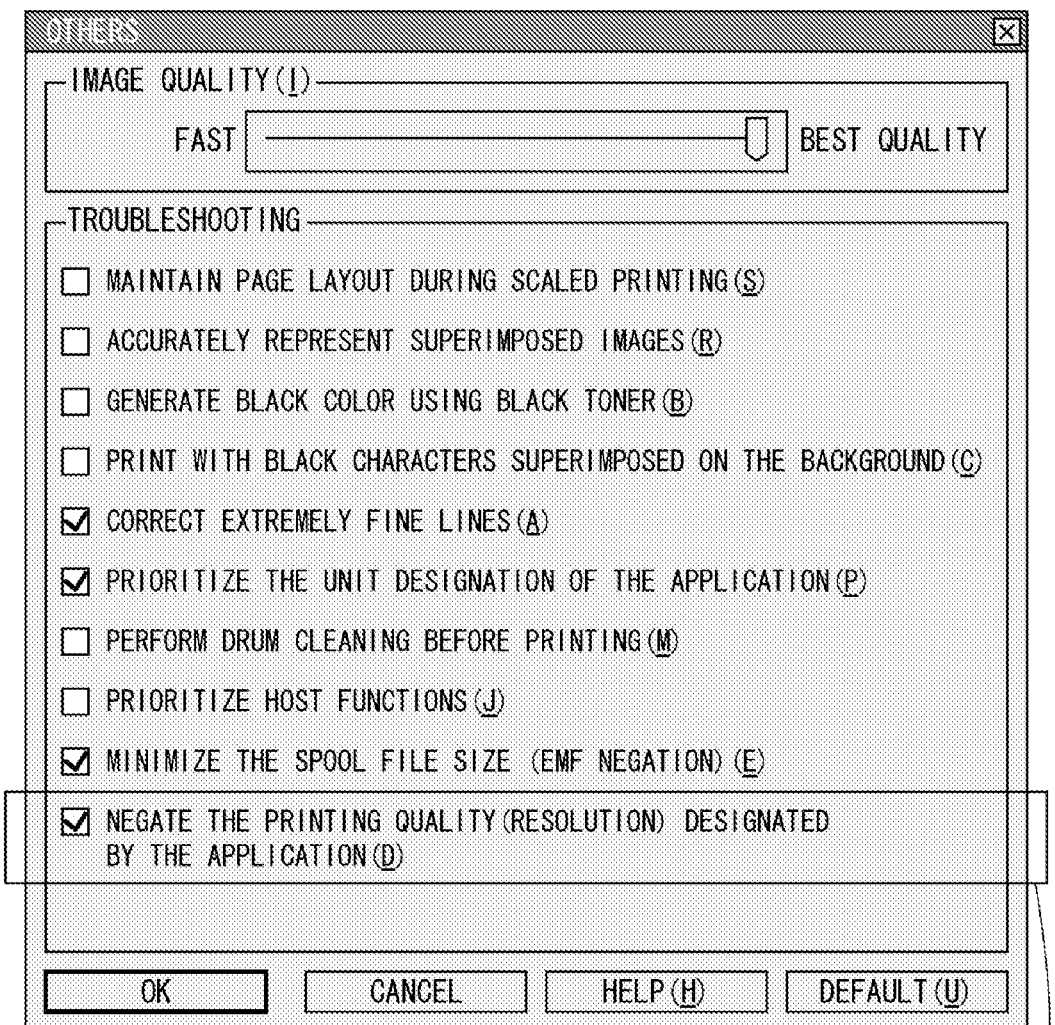
FIG. 4 is an example of an "other" dialogue screen of the information processing apparatus according to the second embodiment.

The AP resolution negation setting unit 31 is for setting whether the printing quality (resolution) designated on the AP side is usable or unusable, and an example display menu thereof is displayed in FIG. 4. As described in detail hereinafter, the AP resolution negation setting unit 31 has an AP resolution negation menu 50 containing a "menu for negating a printing quality (resolution) designation by the application" in a "help" block in an "other" dialogue screen, so that the printing quality (resolution) setting can be negated.

The resolution response unit 32 responds to a driver ability query from the AP (1) with the information concerning resolution. The response is sent via the DEVMODE structure of a printing target worksheet in accordance with a presence or lack of the negation setting of the AP resolution negation setting unit 31.

Through the aforementioned structure, the information processing apparatus of the second embodiment performs in the following manner. The performance is described using a functional block diagram of FIG. 3, an "other" dialogue example of FIG. 4, a performance flow chart of FIG. 5, and a "page setting" dialogue of FIGS. 6 to 8.

First, a dialogue box, as shown in FIG. 4, is displayed by the AP resolution negation setting unit 31 equipped on the UI unit 4 of the driver 3. This dialogue contains the "menu for negating a printing quality (resolution) designation by the application", as the AP resolution negation menu 50, in a "help" block.

When a checkmark is entered in the AP resolution negation menu 50, the printing quality (resolution) designated by the AP (1) is negated and the printing quality (resolution) designated by the driver 3 is put into effect.

Figure 6:
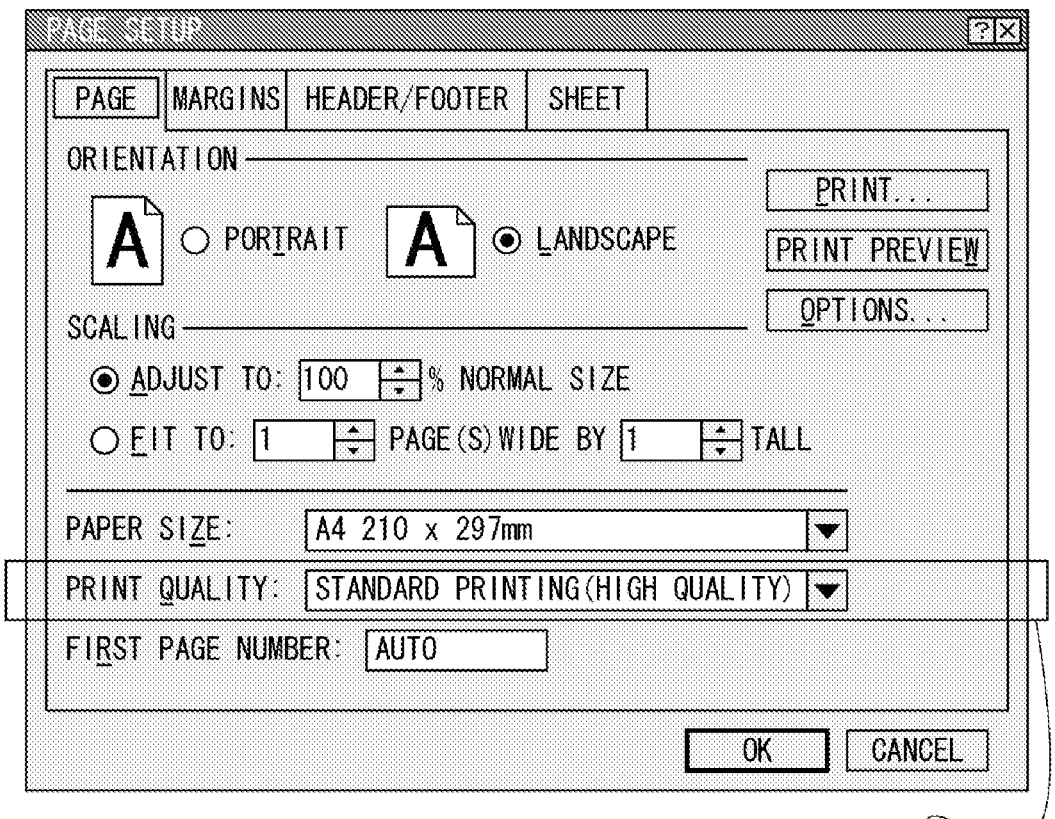
FIG. 6 is an example of an AP setting screen in a case where a driver adopts a "printing quality level format"
Figure 7:
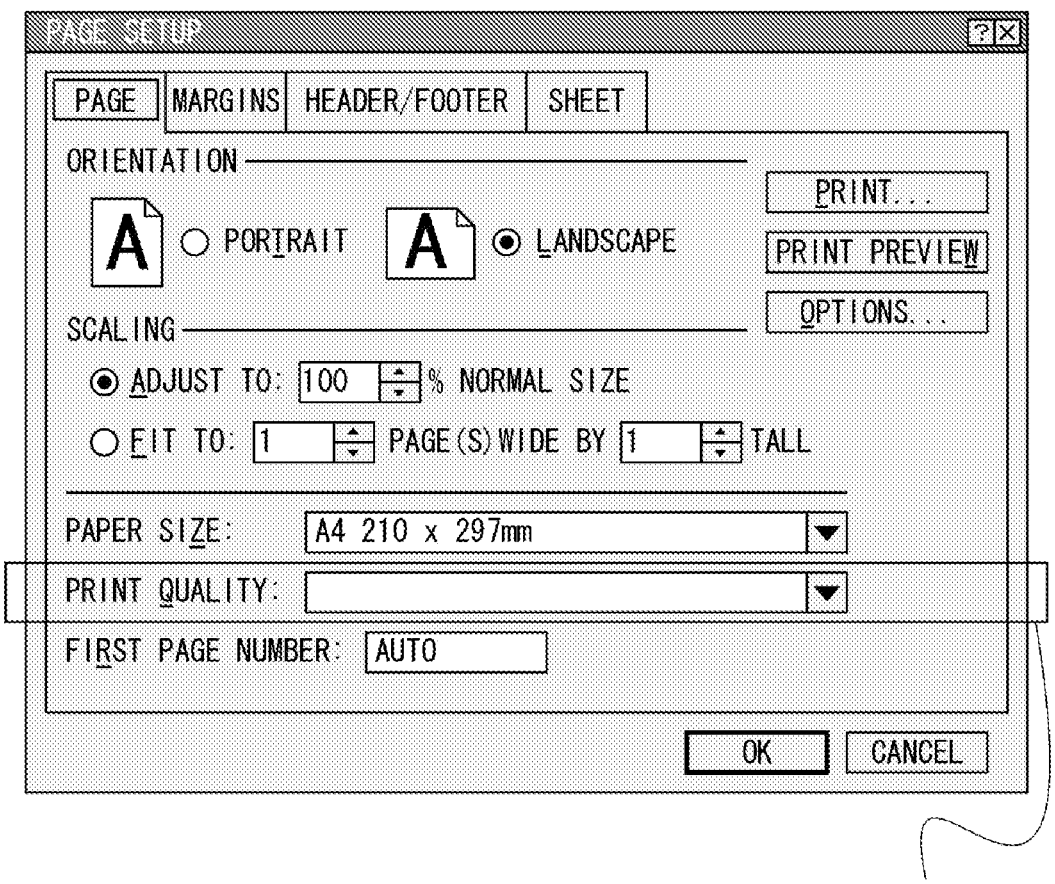
FIG. 7 is an example of the AP setting screen in a case where the driver adopts a "DPI format"
Figure 8:
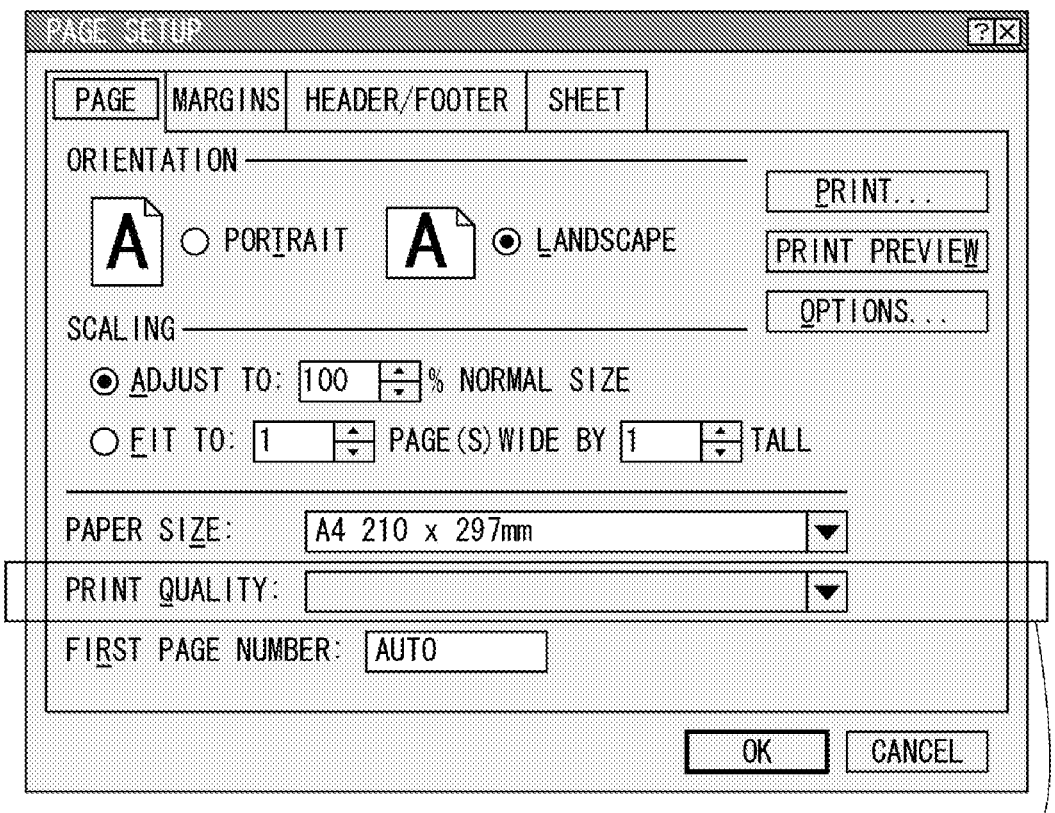
FIG. 8 is an example of the AP setting screen in a case where the AP printing quality (resolution) is negated by the driver.

The following is a description, referencing FIGS. 6 to 8, of how the print settings of the AP (1) change, using Microsoft's Excel as an example.

First, in the same manner as the first embodiment, each worksheet is created by the AP (1). At this time, the printing quality (resolution) with which each worksheet is saved is determined by the designated format (DPI format and printing quality level format) of the printing quality (resolution) of the connected driver 3 at a time when the worksheet is created or edited, so that the worksheet is saved in the corresponding format.

The worksheet is then selected and, upon selection of "page settings" from "file", the "page settings" dialogue of FIGS. 6 to 8 is displayed. As described below, a different setting is displayed in a printing quality level format settings list box 51 of the "printing quality" block in the "page settings" dialogue for each of the FIGS. 6 to 8, according to the designated format of the printing quality (resolution) of the driver 3.

FIG. 6 shows a screen in a case where the driver 3 adopts the printing quality level format as the printing quality (resolution). In such a case, because Excel adopts a format that designates the printing quality (resolution) as the printing quality level, which is identical to the printing quality level format of the printing quality (resolution) adopted by the driver 3, the content saved according to the designated format of the printing quality (resolution) of the driver at a time when the text is created is displayed, and the printing quality level format settings list box 51 is opened if necessary, so that the designation can be changed.

On the other hand, FIG. 7 shows a case where the driver 3 adopts the DPI format. In such a case, because Excel adopts a format that designates the printing quality (resolution) as the printing quality level, nothing is displayed for the printing quality (resolution) when the driver 3 adopts the DPI format.

FIG. 8 shows a page settings screen of Excel in a case where a checkmark is entered in the menu for "negating a printing quality (resolution) designation by the application" in which the printing quality designated in the printing quality level format setting list box 51 is grayed out. In such a case, the printing quality (resolution) from the AP (1) is negated, so that the printing quality (resolution) designated by the driver 3 is put into effect as the printing quality (resolution).

Figure 5:
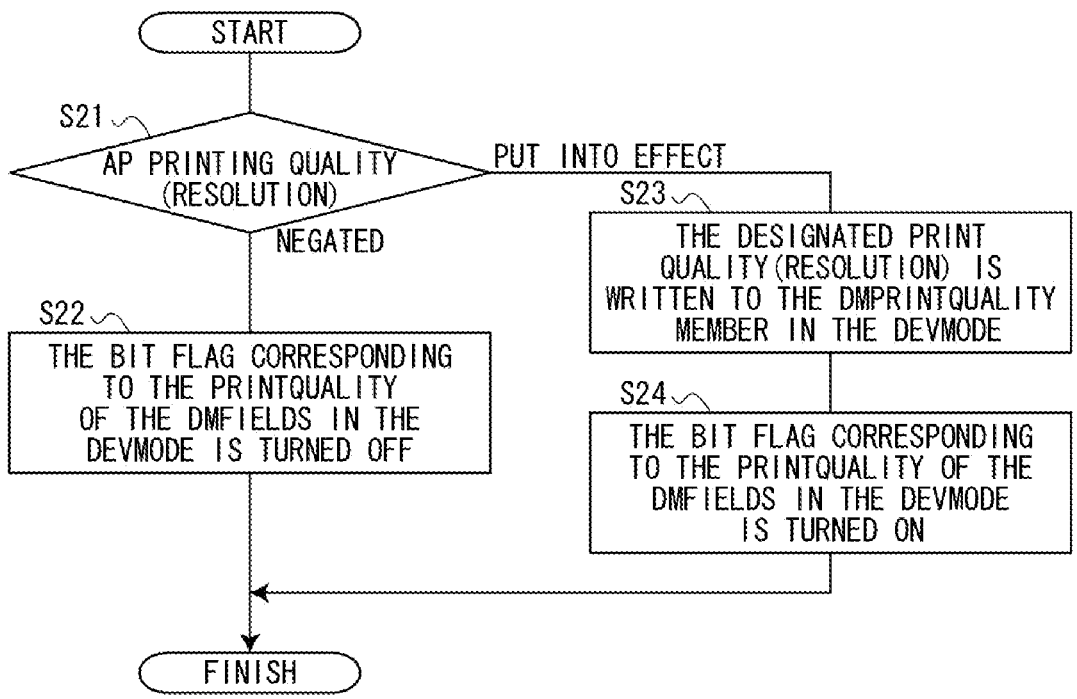
FIG. 5 is a performance flow chart of the information processing apparatus according to the second embodiment.

The following is a description, using the flow chart of FIG. 5, of the manner in which the content designated through the menu for "negating a printing quality (resolution) designation by the application" negates the printing quality (resolution) of the AP (1). FIG. 5 is a performance flow chart showing only the performance of the resolution response unit.

First, the content designated in the menu for "negating a printing quality (resolution) designation by the application" is determined (step S21). In a case where the printing quality (resolution) designation is negated, an index bit of a dmPrinting quality in a dmFields of the DEVMODE structure 33 is turned off (step S22).

Here, the dmFields is used as index information showing, through a bit flag, whether a condition of various members existing in the DEVMODE structure 33 has been updated or not. The dmPrinting quality is a member within the basic section of the DEVMODE structure 33 for showing resolution, and is set as information defining the resolution, such as DMRES_HIGH, DMRES_MEDIUM, DMRES_LOW, or DMRES_DRAFT, for example.

In a case where the printing quality (resolution) designation is negated, because the index bit of the dmPrinting quality in the dmFields of the DEVMODE structure 33 is turned off as shown in step S22, a judgment is made that the driver 3 does not have the resolution setting ability, and therefore the resolution designated from the AP (1) cannot be achieved.

As a result, the printing quality level format settings list box 51, serving as the printing quality setting section, of the AP (1) is grayed out, as shown in FIG. 8. Printing in such a condition is executed with the printing quality (resolution) designated by the driver 3.

On the other hand, in a case where the determination at step S21 is that the printing quality (resolution) designation is put into effect, a resolution value designated by the driver 3 is written into the dmPrinting quality of the DEVMODE structure 33 (step S23), and the index bit of the dmPrinting quality in the dmFields is turned on (step S24).

Next, because the AP (1) detects that the index bit of the dmPrinting quality in the dmFields of the DEVMODE structure 33 is turned on, a judgment is made that the resolution designated from the AP (1) can be achieved and the screen shown in FIG. 6 is displayed in the printing quality level format settings list box 51, so that the printing quality (resolution) can be changed as necessary.

In the above description, the printing quality (resolution) from the AP (1) is negated through the menu for "negating a printing quality (resolution) designation by the application", but in a case where the format of the printing quality (resolution) designated by the AP (1) is not identical to the format of the printing quality (resolution) designated by the driver 3 at a time when the page setting dialogue of the AP (1) is displayed, the printing quality (resolution) designated by the AP (1) may be negated. At such a time, notification of the negation of the printing quality (resolution) designated by the AP (1) may be output in the form of a message, sound, or the like.

As described in detail above, through the information processing apparatus of the second embodiment, because the printing quality (resolution) from the AP can be negated by the equipped AP resolution negation setting section, all worksheets can be printed with the same print settings, without breaking up the print job, thereby achieving the desired printing result. Furthermore, the above description uses a printer driver as an example of the information processing apparatus, but an image forming apparatus may also be used as the information processing apparatus.

The present invention can be widely used in an information processing apparatus connected to or equipped on a printer, fax machine, an MFP (Multifunction Printer) combining a scanner function with the aforementioned functions, a copy machine, or the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An information processing apparatus having a processor and a memory, the apparatus comprising:
    a reception unit for receiving printing data that includes a plurality of page data units, each page data unit being set with a respective prescribed print setting;
    an input unit for inputting a common print setting; and
    a conversion unit for converting each of the prescribed print settings of the page data units into the common print setting on a page data unit by page data unit basis such that each of the page data units is printed based on the common print setting rather than the prescribed print setting set for each page data unit,
    wherein the prescribed print setting of a second one of the page data units is converted into the common print setting after a print job that includes a first one of the page data units in addition to the second one of the page data units has started.

2. The information processing apparatus according to claim 1, wherein at least one of the page data units is a worksheet.

3. The information processing apparatus according to claim 1, wherein said information processing apparatus includes a printer driver.

4. The information processing apparatus according to claim 1, wherein said information processing apparatus is an image forming apparatus.

5. The information processing apparatus according to claim 1, wherein the conversion unit reproduces the common print setting to a DEVMODE structure.

6. The information processing apparatus according to claim 5, wherein the conversion unit reproduces the common print setting of a previously printed worksheet to the DEVMODE structure.

7. The information processing apparatus according to claim 6, wherein the conversion unit reproduces any one of an N-UP setting, a resolution setting, a color mode setting, or a double sided print setting to the DEVMODE structure.

8. The information processing apparatus according to claim 1, further comprising a printing resolution negation section to negate a printing resolution designated by an application, wherein printing is executed with the printing resolution designated by a printer driver at a time when a printing resolution designation is negated by the printing resolution negation section.

9. The information processing apparatus according to claim 8, wherein printing is executed where an index bit in a DEVMODE structure is turned off when a printing resolution designation is negated by the printing resolution negation section.

10. The information processing apparatus according to claim 1, wherein the prescribed print setting for one of the page data units is copied for a subsequent one of the page data units.

11. The information processing apparatus according to claim 1, wherein the conversion unit judges whether the same job is in progress, and if so the common print setting is copied for a subsequent one of the page data units.

12. The information processing apparatus according to claim 1, further comprising a page break judgment section that judges whether a page break is necessary if the prescribed print settings for adjacent page data units changes.

13. The information processing apparatus according to claim 12, wherein the prescribed print settings include paper size, N-UP printing, and resolution.

14. The information processing apparatus according to claim 12, wherein the page break judgment section judges whether or not a page break is necessary after the prescribed print settings have been converted to the common print setting.

15. The information processing apparatus according to claim 1 wherein, if an application printing resolution designation for one of the page data units is changed in the common print setting, a printing quality for said one of the page data units cannot be set by an operator.

16. The information processing apparatus according to claim 1, wherein each page data unit comprises data for printing a single full-size page.

17. An image forming apparatus comprising:
    a reception unit for receiving printing data that includes a plurality of page data units, each page data unit being set with a respective prescribed print setting;
    an input unit for inputting a common print settings; and
    a conversion unit for converting each of the prescribed print settings of the page data units into the common print setting on a page data unit by page data unit basis such that the page data units are printed based on the common print setting rather than the prescribed print settings for the page data units,
    wherein the prescribed print setting of a second one of the page data units is converted into the common print setting after a print job that includes a first one of the page data units in addition to the second one of the page data units has started.

18. The image forming apparatus according to claim 17, wherein each page data unit comprises data for printing a single full-size page.

\* \* \* \* \*